United States Patent
Ramic et al.

(10) Patent No.: US 11,651,770 B2
(45) Date of Patent: *May 16, 2023

(54) VEHICLE FUNCTION CONTROL WITH SENSOR BASED VALIDATION

(71) Applicant: Google LLC, Mountain View, CA (US)

(72) Inventors: Haris Ramic, San Francisco, CA (US);
Vikram Aggarwal, Palo Alto, CA (US);
Moises Morgenstern Gali, San Francisco, CA (US); David Roy Schairer, San Jose, CA (US); Yao Chen, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/019,932

(22) Filed: Sep. 14, 2020

(65) Prior Publication Data

US 2020/0411005 A1 Dec. 31, 2020

Related U.S. Application Data

(63) Continuation of application No. 16/608,235, filed as application No. PCT/US2017/054847 on Oct. 3, 2017, now Pat. No. 10,783,889.

(51) Int. Cl.
*G10L 15/22* (2006.01)
*G06F 3/16* (2006.01)
(Continued)

(52) U.S. Cl.
CPC ........... *G10L 15/22* (2013.01); *B60W 50/087* (2013.01); *G06F 3/167* (2013.01); *G10L 15/26* (2013.01); *G10L 2015/223* (2013.01)

(58) Field of Classification Search
CPC ... G10L 15/22; G10L 15/26; G10L 2015/223; G10L 2015/228; B60W 50/087;
(Continued)

(56) References Cited

U.S. PATENT DOCUMENTS 6,230,138 B1 * 5/2001 Everhart ................. G10L 15/26
704/E15.044
6,420,975 B1 * 7/2002 DeLine ................ G06Q 20/341
381/86
(Continued)

FOREIGN PATENT DOCUMENTS

CN 101323305 12/2008
CN 104821167 8/2015
(Continued)

OTHER PUBLICATIONS

Japanese Patent Office; Office Action issued in Application No. 2019-568383; 11 pages; dated Feb. 8, 2021.
(Continued)

*Primary Examiner* — Michael Colucci
(74) *Attorney, Agent, or Firm* — Gray Ice Higdon (57) ABSTRACT

The present disclosure is generally related to a data processing system to validate vehicular functions in a voice activated computer network environment. The data processing system can improve the efficiency of the network by discarding action data structures and requests that invalid prior to their transmission across the network. The system can invalidate requests by comparing attributes of a vehicular state to attributes of a request state.

20 Claims, 4 Drawing Sheets

(51) Int. Cl.
*B60W 50/08* (2020.01)
*G10L 15/26* (2006.01)

(58) Field of Classification Search
CPC ........... B60W 2050/065; B60W 50/12; B60W 50/06; B60W 40/08; B60W 50/14; B60W 2050/146; B60W 2420/00; B60W 2050/005; G06F 3/167; B60K 2370/148; B60K 35/00; B60R 21/01508; B60R 16/0373
See application file for complete search history.

(56) References Cited

U.S. PATENT DOCUMENTS

| | | | | |
|---|---|---|---|---|
| 6,782,240 | B1 * | 8/2004 | Tabe | H04M 1/6083 455/66.1 |
| 6,906,632 | B2 * | 6/2005 | DeLine | B60R 11/0217 381/86 |
| 9,530,414 | B2 * | 12/2016 | Zhao | B60W 50/08 |
| 9,547,306 | B2 * | 1/2017 | Wuth Sepulveda | G05D 1/0022 |
| 10,783,889 | B2 | 9/2020 | Ramic et al. | |
| 2006/0161430 | A1 * | 7/2006 | Schweng | G10L 25/78 704/E11.003 |
| 2008/0201148 | A1 * | 8/2008 | Desrochers | G10L 15/22 704/E15.044 |
| 2009/0055180 | A1 * | 2/2009 | Coon | B60R 16/0373 704/251 |
| 2009/0265103 | A1 * | 10/2009 | Kostepen | G06F 16/9537 707/E17.014 |
| 2010/0030458 | A1 | 2/2010 | Coughlin | |
| 2011/0257973 | A1 * | 10/2011 | Chutorash | G01C 21/3661 701/1 |
| 2012/0215539 | A1 * | 8/2012 | Juneja | G10L 25/60 704/E15.005 |
| 2013/0117021 | A1 * | 5/2013 | James | G01C 21/362 704/235 |
| 2013/0185066 | A1 * | 7/2013 | Tzirkel-Hancock | G10L 21/003 381/71.4 |
| 2014/0067403 | A1 * | 3/2014 | Burke | G06F 3/167 704/E21.001 |
| 2015/0019074 | A1 * | 1/2015 | Winter | B60K 37/06 704/231 |
| 2015/0149021 | A1 | 5/2015 | Duncan et al. | |
| 2015/0243168 | A1 * | 8/2015 | Roelle | G08G 1/133 340/995.27 |
| 2017/0176641 | A1 | 6/2017 | Zhu et al. | |
| 2017/0221480 | A1 | 8/2017 | Tzirkel-Hancock et al. | |
| 2017/0259811 | A1 * | 9/2017 | Coulter | B60W 10/20 |
| 2018/0370544 | A1 | 12/2018 | Kitagawa | |

FOREIGN PATENT DOCUMENTS

| | | |
|---|---|---|
| CN | 105292130 | 2/2016 |
| CN | 105917248 | 8/2016 |
| DE | 19704857 | 8/1998 |
| DE | 102011013491 | 4/2012 |
| EP | 1354740 | 10/2003 |
| EP | 2902991 | 8/2015 |
| JP | 2009046082 | 3/2009 |
| JP | 2014134483 | 7/2014 |
| JP | 2015136107 | 7/2015 |
| JP | 2015160522 | 9/2015 |
| JP | 2016149105 | 8/2016 |
| JP | 2017505918 | 2/2017 |
| JP | 2017087950 | 5/2017 |
| KR | 20150059955 | 6/2015 |
| WO | 2014024751 | 7/2016 |
| WO | 2017086000 | 5/2017 |

OTHER PUBLICATIONS

China National Intellectual Property Administration; Office Action issued in Application 201780091946.5; 16 pages; dated Dec. 22, 2020.
European Patent Office: Intention To Grant issued for Application No. 17791496.7 dated Oct. 7, 2020.
The Korean Intellectual Property Office; Notice of Office Action issued in Application No. 10-2020-7030003; 11 pages; dated Jul. 5, 2021.
China National Intellectual Property Administration; Notice of Allowance issued in Application No. 201780091946.5; 4 pages; dated Mar. 30, 2021.
Japanese Patent Office; Notice of Reasons for Rejection issued in Application No. 2019-568383; 09 pages; dated Aug. 2, 2021.
Intellectual Property India; Examination Report issued in Application No. 201927050798; 6 pages; dated Jul. 30, 2021.
Japanese Patent Office; Notice of Allowance issued in Application No. 2019-568383; 3 pages; dated Nov. 15, 2021.
Korean Intellectual Property Office; Notice of Allowance issued in Application No. 10-2020-7030003, 4 pages, dated Feb. 4, 2022.
Japanese Patent Office; Office Action issued in Application No. 2019-568383; 11 pages; dated Aug. 3, 2020.
China National Intellectual Property Administration; Office Action issued in Application 201780091946.5; 21 pages; dated Jul. 8, 2020.
The Korean Intellectual Property Office; Office Action issued in Application No. 10-2019-7038984 dated Feb. 21, 2020. 106 Pages.
European Patent Office; International Search Report and Written Opinion for Ser. No. PCT/US2017/054847; 14 pages; dated Jul. 12, 2018.
The Korean Intellectual Property Office; Notice of Office Action issued in Application No. 10-2022-7014836; 11 pages; dated Jan. 19, 2023.
Japanese Patent Office; Notice of Reasons for Rejection issued in Application No. 2021-202525; 4 pages; dated Feb. 6, 2023.

* cited by examiner

VEHICLE FUNCTION CONTROL WITH SENSOR BASED VALIDATION

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response if the responding computing device is at or above its processing capacity, which may result in inefficient bandwidth utilization. A portion of the excessive network transmissions can include transmissions for requests that are not valid requests.

SUMMARY

According to an aspect of the disclosure, a system to validate vehicular functions can include a data processing system. The system can include a natural language processor component that is executed by the data processing system. The natural language processor can receive, via an interface of the data processing system, an input audio signal. The natural language processor component can parse the input audio signal to identify a request, a vehicle associated with the request, and a fulfillment interface associated with the request and the vehicle. The system can include a direct action application programming interface to generate, based on the request, a first action data structure. The system can include a validation engine to determine a vehicular state of the vehicle associated with the request based on a first set of sensor data. The vehicular state can include a first plurality of attributes. The validation engine can determine a request state based on the request and a second set of sensor data. The request state can include a second plurality of attributes. The validation engine can compare the second plurality of attributes of the request state to the first plurality of attributes of the vehicular state. The validation engine can transmit, based on one of the second plurality of attributes of the request state matching one of the first plurality of attributes of the vehicular state, the first action data structure to the fulfillment interface to execute a function associated with the first action data structure.

According to an aspect of the disclosure, a method to validate vehicular functions can include receiving, by a natural language processor component executed by a data processing system and via an interface of the data processing system, an input audio signal. The method can include parsing, by the natural language processor, the input audio signal to identify a request, a vehicle associated with the request, and a fulfillment interface associated with the request and the vehicle. The method can include generating, by a direct action application programming interface and based on the request, a first action data structure. The method can include determining, by a validation engine, a vehicular state of the vehicle associated with the request based on a first set of sensor data. The vehicular state can include a first plurality of attributes. The method can include determining, by the validation engine, a request state based on the request and a second set of sensor data. The request state can include a second plurality of attributes. The method can include comparing, by the validation engine, the second plurality of attributes of the request state to the first plurality of attributes of the vehicular state. The method can include transmitting, by the validation and based on one of the second plurality of attributes of the request state matching one of the first plurality of attributes of the vehicular state, the first action data structure to the fulfillment interface to execute a function associated with the first action data structure.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for multi-modal transmission of packetized data in a voice activated data packet-based computer network environment. The various concepts introduced above and discussed in greater detail below may be implemented in any of numerous ways.

The present disclosure is generally directed to a data processing system to validate the requests within packetized audio signals in a voice-activated computer network environment. The data processing system can improve the efficiency and effectiveness of auditory data packet transmission over one or more computer networks by, for example, discarding or otherwise disabling requests (and their associated action data structures) that are not valid prior to their transmission across a network. The present solution can also improve computational efficiency by preventing the data processing system from performing further computational operations on action data structures that are not valid and should be discarded. By disabling the transmission of invalid requests, the system can reduce bandwidth utilization by not transmitting the data packets carrying the invalid action data structures across the network. Processing the naturally spoken audio signal can be a computationally intensive task. By detecting possibly invalid requests, the system can reduce computational waste by enabling the system to skip, temporarily skip, discard, or modify the possibly invalid request.

The systems and methods described herein can include a data processing system that receives an audio input query, which can also be referred to as an audio input signal. The input audio signal can include a request to perform a function in a vehicular setting, such as open the window or start the car. From the input audio signal, the data processing system can identify the request. The system can generate action data structures based on the audio input query. The action data structure can include attributes that indicate requirements for fulfilling the request. The system can determine a vehicular state and the attributes associated with the vehicular state. The system can compare and analyze the attributes of the action data structure to the attributes of the vehicular state to determine if the request should be fulfilled. If the attributes of the vehicular state and the action data structure do not match, the system can disable or discard the action data structure (and the associated request) and prevent a fulfillment interface from fulfilling the request, which saves network bandwidth, reduces processor utilization, and saves electrical power.

Figure 1:
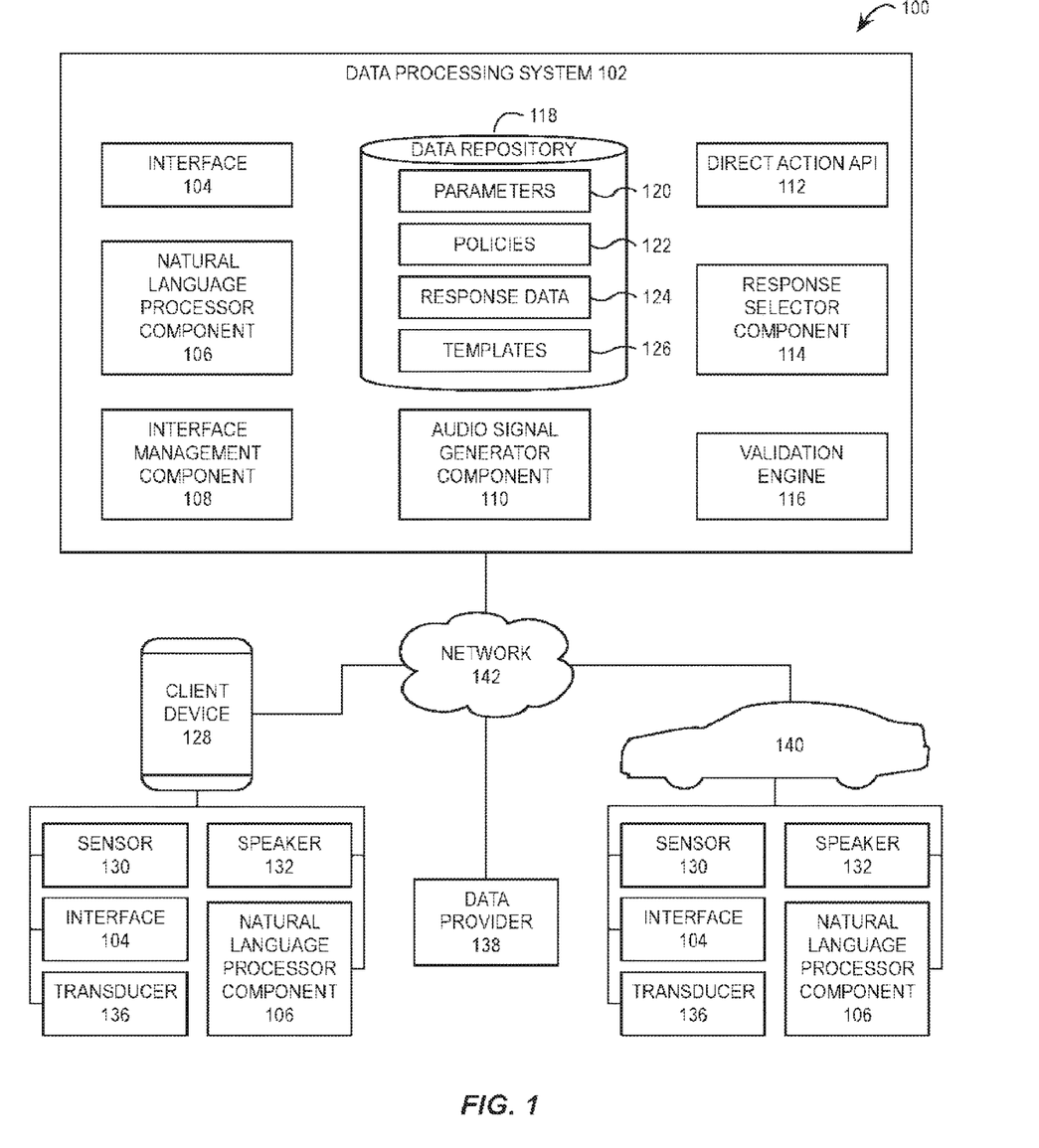
FIG. 1 illustrates an example system to authenticate and control vehicle functions with sensor-based validation.

FIG. 1 illustrates an example system 100 to authenticate and control vehicular functions with sensor-based validation. The system 100 can include at least one data processing system 102, one or more client devices 128, and one or more vehicles 140.

The data processing system 102 can include an interface 104. The data processing system 102 can include a natural language processor (NLP) component 106 to parse audio-based inputs. The data processing system 102 can include an interface management component 108 to detect and manage the interfaces of other devices in the system 100. The data processing system 102 can include an audio signal generator component 110 to generate audio-based signals. The data processing system 102 can include a direction action application programming interface (API) 112. The data processing system 102 can include a response selector component 114 to select responses to audio-based input signals. The data processing system 102 can include a validation engine 116 to validate audio-based inputs received by the data processing system 102. The data processing system 102 can include a data repository 118 in which the data processing system 102 can store parameters 120, policies 122, response data 124, and templates 126. The client device 128 and the vehicle 140 can include and execute instances of the components of the data processing system 102. In some implementations, the client device 128 and the vehicle 140 can each include an instance of the data processing system 102.

The system 100 can also include one or more client devices 128. The client devices 128 can include sensors 130, speakers 132, interfaces 104, and transducers 136. The client devices 128 can execute an instance of the NLP component 106. The system 100 can also include one or more data providers 138. The system 100 can include one or more vehicles 140. The vehicles 140 can include sensors 130, speakers 132, interfaces 104, and transducers 136. The vehicles 140 can execute an instance of the NLP component 106. The components of the system 100 can communicate over a network 142. In some implementations, one or more of the client devices 128 can be located within an instance of the vehicle 140. For example, the client device 128 can be the mobile phone of a driver driving the vehicle 140. In some implementations, one or more of the client devices 128 can be remote to the vehicles 140. For example, after the driver parks and exits the vehicle 140 for work, the driver's mobile phone is remote to the vehicle 140.

The network 142 can include computer networks such as the internet, local, wide, metro, or other area networks, intranets, satellite networks, other computer networks such as voice or data mobile phone communication networks, and combinations thereof. The network 142 can be used by the data processing system 102, client devices 128, and vehicles 140 to access information resources such as web pages, web sites, domain names, uniform resource locators, or data providers 138. For example, the data processing system 102 can, via the network 142, access a data provider 138 that provides weather data for specific locations, such as a location associated with a vehicle 140.

The network 142 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 142 can include a wireless link, such as an infrared channel or satellite band. The topology of the network 142 may include a bus, star, or ring network topology. The network 142 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The client devices 128 and the vehicles 140 can each include at least one logic device such as a computing device having a processor to communicate with each other with the data processing system 102 via the network 142. The client devices 128 and the vehicles 140 can include an instance of the any of the components described in relation to the data processing system 102. The client devices 128 and the vehicles 140 can include an instance of the data processing system 102. The client devices 128 can include a desktop computer, laptop, tablet computer, personal digital assistant, smartphone, mobile device, portable computer, thin client computer, virtual server, speaker-based digital assistant, or other computing device. The vehicle 140 can include manual or autonomous cars, trucks, buses, industrial vehicles, motorcycles, or other transportation machines. The vehicle 140 can include one or more processors that can execute an instance of the data processing system 102 or any component thereof. The processors can be a component of the vehicle's head unit.

The client device 128 and the vehicle 140 can include at least one sensor 130, at least one transducer 136, at least one audio driver, and at least one speaker 132. The sensor 130 can include a microphone or audio input sensor. The sensor 130 can also include at least one of a GPS sensor, proximity sensor, ambient light sensor, temperature sensor, motion sensor, accelerometer, or gyroscope. The sensor can include an occupancy or weight sensor. The transducer 136 can convert the audio input into an electronic signal. The audio driver can include a script or program executed by one or more processors of the client device 128 or the vehicle 140 to control the speaker 132. The speaker 132 can render audio signals by converting electrical signals into audible waves.

The client device 128 and the vehicle 140 can be associated with an end user that enters voice queries as input audio signal into the client device 128 or the vehicle 140 (via the sensor 130) and receives audio output in the form of a computer generated voice that can be provided from the data processing system 102. In response to the input audio signals, the client device 128 and the vehicle 140 can also receive action data structures to perform predetermined functions or actions. The interface 104 can receive or provide data messages to the direct action API 112 of the data processing system 102 and enable communication between the components of the system 100. The client device 128 and the vehicle 140 can also include a user interface that enables a user to interact with the components of the system 100.

The system's data processing system 102 can include at least one server having at least one processor. For example, the data processing system 102 can include a plurality of servers located in at least one data center or server farm. The data processing system 102 can determine from an audio input signal a request and a trigger keyword associated with the request. Based on the request and trigger keyword, the data processing system 102 can generate or select response data. The response data can be audio-based or text-based. For example, the response date can include one or more audio files that when rendered provide an audio output or acoustic wave. The data within the response data can also be referred to as content items. The response data can include other content (e.g., text, video, or image content) in addition to audio content.

The data processing system 102 can include multiple, logically grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repository 118 and with other computing devices.

The data processing system 102 can include the data repository 118. The data repository 118 can include one or more local or distributed databases and can include a database management system. The data repository 118 can include computer data storage or memory and can store one or more parameters 120, one or more policies 122, response data 124, and templates 126, among other data. The parameters 120, policies 122, and templates 126 can include information such as rules about a voice based session between the client device 128, data processing system 102, and vehicle 140. The response data 124 can include content items for audio output or associated metadata, as well as input audio messages that can be part of one or more communication sessions with the client device 128.

An application, script, program, or other components that are associated with the data processing system 102 can be installed at the client device 128 or the vehicle 140. The application can enable the client device 128 or vehicle 140 to communicate input audio signals (and other data) to the interface 104 of the data processing system 102. The application can enable the client device 128 and the vehicle 140 to drive components of the client device 128 and the vehicle 140 to render the output audio signals.

The data processing system's NLP component 106 can receive input audio signals. The data processing system 102 can receive the input audio signal from the client device 128 or the vehicle 140. A first device can execute the NLP component 106 and the NLP component 106 can receive the input audio signal from a second device. For example, the vehicle 140 can execute the NLP component 106 and the input audio signal can be received from the client device 128.

The NLP component 106 can convert input audio signals into recognized text by comparing the input audio signal against a stored, representative set of audio waveforms and choosing the closest matches. The representative waveforms can be generated across a large set of input audio signals. Once the input audio signal is converted into recognized text, the NLP component 106 can match the text to words that are associated, for example, via a learning phase, with actions or output audio signals.

From the input audio signal, the NLP component 106 can identify at least one request or at least one trigger or hot keyword corresponding to the request. The request can indicate intent or subject matter of the input audio signal. The trigger keyword can indicate a type of action likely to be taken. For example, the NLP component 106 can parse the input audio signal to identify at least one request to open the vehicle's windows or skip to a next audio file in a music playlist. The trigger keyword can include at least one word, phrase, root or partial word, or derivative indicating an action to be taken. For example, the trigger keywords "go" or "ok" or "hey."

The response selector component 114 can obtain information from the data repository 118, where it can be stored as part of the response data 124. The response selector component 114 can query the data repository 118 to select or otherwise identify response phrases or content item, e.g., from the response data 124.

The audio signal generator component 130 can generate or otherwise obtain an output signal that includes the content item. The data processing system 102 can execute the audio signal generator component 110 to generate or create an output signal corresponding to the content item or request. For example, once a request is fulfilled, the signal generator component 110 can generate an audio output signal that includes the phrase "The action was completed."

The interface 104 can be a data interface or a network interface that enable the components of the system 100 to communicate with one another. The interface 104 of the data processing system 102 can provide or transmit one or more data packets that include the action data structure, audio signals, or other data via the network 142 to the client device 128 or vehicle 140. For example, the data processing system 102 can provide the output signal from the data repository 118 or from the audio signal generator 110 to the client device 128. The data processing system 102 can also instruct, via data packet transmissions, the client device 128 or the vehicle 140 to perform the functions indicated in the action data structure. The output signal can be obtained, generated, transformed to or transmitted as one or more data packets (or other communications protocol) from the data processing system 102 (or other computing device) to the client device 128 or the vehicle 140.

The direct action API 112 of the data processing system 102 can generate, based on, for example, the request, action data structures. The action data structure can include data or instructions for the execution of a specified action to satisfy the request. In some implementations, the action data structure can be a JSON formatted data structure or an XML formatted data structure.

Depending on the action specified in the request, the direct action API 112 can execute code or a dialog script that identifies the parameters required to fulfill the request. The action data structures can be generated responsive to the request. The action data structure can be included in messages that are transmitted to or received by the client device 128 or the vehicle 140. Based on the request parsed by the NLP component 106, the direct action API 112 can determine to which of the client devices 128 or the vehicles 140 the message should be sent. For example, if an input audio signal includes "open a window," the NLP component 106 can identify the action word "open a window." The direct action API 112 can package the request into an action data structure for transmission to a vehicle 140. The direction action API 112 can access a vehicle ID from the response data 124 to determine which vehicle is associated with the user that generated the request. Once received, the vehicle 140 can process the action data structure and open the vehicle's window.

The action data structure can include information for completing the request. For example, the action data structure can be a XML or JSON formatted data structure that includes attributes used in completing or otherwise fulfilling the request. The attributes can include a location of the vehicle 140, a location of the client device 128, an authorization level of a user associated with a client device 128, a vehicle identifier, an interface identifier, a vehicular state, or a request state. In some implementations, the request state includes one or more attributes that should be satisfied before the action is fulfilled. For example, the request "Ok, change the song" the request state may have the attribute {requester: [authorized, passenger]} indicating that the request should be an explicitly authorized user or a passenger in the vehicle.

The direct action API 112 can retrieve a template 126 from the repository 118 to determine which fields or attributes to include in the action data structure. The direct action API 112 can determine necessary parameters and can package the information into an action data structure. The direct action API 112 can retrieve content from the repository 118 to obtain information for the attributes of the data structure.

The direct action API 112 can populate the fields with data from the input audio signal. The direction action API 112 can also populate the fields with data from the data provider 138, the client device 128, or the vehicle 140. In some implementations, direction action API 112 can prompt a user for additional information when populating the fields. The templates 126 can be standardized for different types of actions, such as playing media files through the vehicle's head unit, responding to messages, and performing functions within the car. In some implementations, the action data structure can initially be generated by a direction action API 112 executed by a remote data processing system 102. The remote data processing system 102 can transmit the action data structure to the data processing system 102 of the vehicle 140, which can add fields and attributes to the action data structure.

The direct action API 112 can obtain response data 124 (or parameters 120 or policies 122) from the data repository 118, as well as data received with end user consent from the client device 128 to determine location, time, user accounts, logistical or other information in order to reserve a car from the car share service, for example. The response data 124 (or parameters 120 or policies 122) can be included in the action data structure. When the content included in the action data structure includes end user data that is used for authentication, the data can be passed through a hashing function before being stored in the data repository 118.

The data processing system 102 (or hardware, processor or memory components thereof) can include, interface, or otherwise communicate with the validation engine 116. The validation engine 116 can validate or otherwise determine if the actions and functions associated with action data structures should be executed or fulfilled. When validated, the validation engine 116 can enable the request to be fulfilled. The validation engine 116 can determine if the requestor has the authority to have the action fulfilled, whether it is safe to fulfill the action, or whether other functions should be fulfilled in place of the requested function or action.

For example, in response to receiving the input audio signal "Ok, open the trunk," the validation engine 116 can determine not to open the trunk because the vehicle 140 is driving down a road and opening the trunk would not be safe. In another example, in response to receiving the input audio signal, "Ok, next song," the validation engine 116 can determine the user has the authority to change the song and skip to the next song. The validation engine 116 can be executed by the client device 128, the vehicle 140, or components thereof. For example, the vehicle 140 may execute a local instance of the validation engine 116 when the vehicle 140. In some implementations, the vehicle 140 can offload computational work to the remote validation engine 116 when the validation engine 116 has a connection to the network 142 and process the requests with a local instance of the validation engine 116 when the vehicle 140 does not have a connection to the network 142.

The validation engine 116 can validate the actions based on data from external sensors data, such as data received from the data providers 138, sensors 130 of the client device 128, and sensors 130 the vehicle 140. The validation engine 116 can also validate the actions based on the administrative rights of a user that generated the input audio signal. The validation engine 116 can validate the actions based on the vehicular state of the vehicle 140.

The validation engine 116 can determine a vehicular state of the vehicle 140 based on a set of sensor data. The vehicular state can indicate the current state of the vehicle 140 where the request is to be fulfilled. The vehicular state can indicate whether the vehicle 140 is moving, in park, or idling. The vehicular state can indicate the speed of the vehicle 140. The validation engine 116 can use a combination of sensor data to determine the vehicular state. The combination of sensor data can be used to differentiate different states that might have similar conditions. For example, the different states of stopped at a red light, stopped in a parking lot, stopped in traffic, and in park in a parking lot may have some similar conditions (e.g., a vehicle speed of 0 mph), but different functions may be authorized in each of the different states. For example, it may be safe to open the trunk when the vehicle 140 is in park in a parking lot but not when the vehicle 140 is stopped at a red light. The vehicular state can include a plurality of sub-states, such as a movement state, an external environment state, an internal environment state, and a device state.

The movement sub-state can include attributes such as current and average speed, current and average acceleration, driving mode status, and gear status. The external environment sub-state can include attributes such as external weather conditions (e.g., raining, sunny, or snowing), external temperature, external weather condition forecast, and external temperature forecast. The internal environment sub-state can include attributes such as an internal temperature and an internal zone temperature. The device sub-state can include attributes such as HVAC status (e.g., air conditioning on, air conditioning off, heating on, etc.), window status, lock status, truck status, door ajar status, sunroof status, heated seat status, heated steering wheel status, headlight status, and interior light status.

The validation engine 116 can determine the vehicular state based on a set of sensor data that can include sensor data from the client devices' sensors 130, sensor data from the vehicles' sensors 130, data from the data provider 138, or any combination thereof. Some of the attributes within the vehicular state can be determined from a single sensor (e.g., door ajar status) and others can be determined from a combination of sensor signals (e.g., movement status can be determine from a combination of speed data and gear data).

The sensor data from the client device 128 can include location data determined by cellular tower triangulation or a GPS receiver in the client device 128, speed data determined by integrating the location data, acceleration data, account data, authorization data, or any combination thereof. The sensor data can include data from one or more data providers 138. The data providers 138 can be internet-based data repositories. The data providers 138 can make their data available by, for example, an API. The data providers 138 can provide weather data, location data, event data, location review data, forecast data, or any combination thereof to the validation engine 116.

The validation engine 116 can determine a request state based on the request parsed from the input audio file. The validation engine 116 can determine the request state based on a second set of sensor data. The data of the first and second set of sensor data can be received as an updating data signal, a vector, data array, scalar value, or other format of data. The request state can include a plurality of attributes under which the action of the request can be executed or that are required for the request to be fulfilled. The request state can be a component of or derived from the action data structure. For example, the request "OK, open the trunk," can include a request state with attributes that indicate the trunk can only open when in a parked condition and when the requested by the driver or an authorized passenger. For example, the request state can be {movement state: parked, requestor: authorized passenger}.

The second set of sensor data for determining the request state can include sensor data from the first set of sensor data the validation engine 116 used to determine the vehicular state. The second set of data can also include the location of the client device 128 (or a user associated therewith) within the vehicle 140.

The validation engine 116 can compare the request state to the vehicular state to determine whether the action of the action data structure should be executed, performed, or further processed. For example, the vehicular state may indicate that the vehicle 140 is parked in a parking lot, with the windows closed, and with the external conditions of rain (e.g., {movement state:parked, windows:closed, external condition:rain}). For example, where the input audio signal is "OK, open the windows," the validation engine 116 may determine that the request state for the request require that the request come from an authorized user, the driving attribute can be driving or parked, and the weather attribute has to be non-rain (e.g., {requestor:authorized, movement state:[driving, parked], external condition:[sunny, overcast, cloudy]}). Comparing the vehicular state to the request state, the validation engine 116 can determine that the vehicular state's external condition attribute does not match (or is not an element of) the request state's external condition attribute. Because the states do not match, the validation engine 116 can determine the request should not be fulfilled because it is raining outside the vehicle 140 and the windows should not be opened when it is raining.

When, for example, the validation engine 116 determines that the function should not be fulfilled, the validation engine 116 can generate a request for confirmation that is presented to the user via the interface 104 of the client device 128 or vehicle 140. The request for confirmation can ask the user if the user would like to override the validation engine's decision not to fulfill the request. When the validation engine 116 determines that the function should not be fulfilled, the validation engine 116 can offer to modify the action data structure. Continuing the above example, the validation engine 116 can generate an audio-based prompt asking if the user would like to tile the sunroof.

Figure 2:
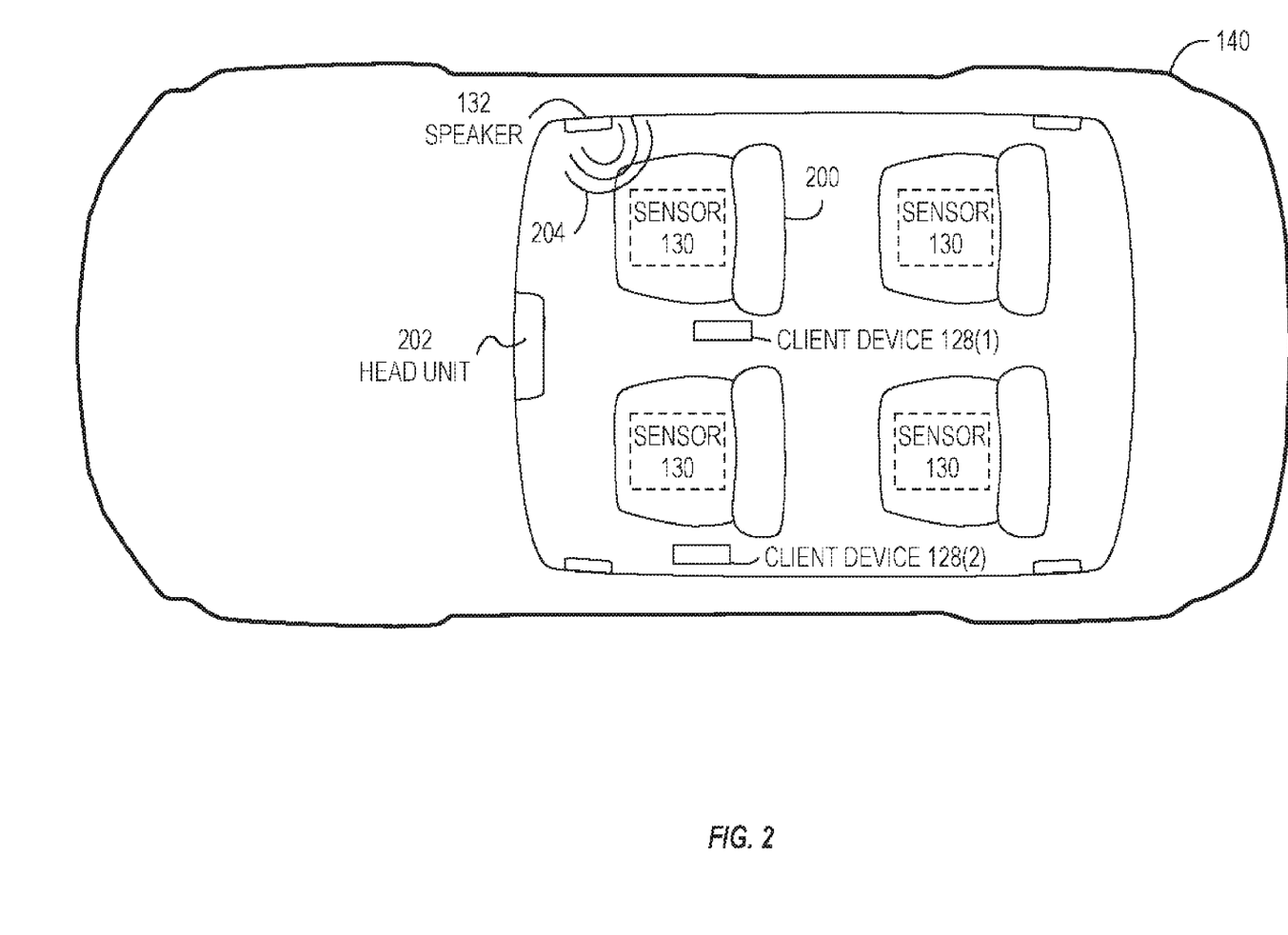
FIG. 2 illustrates a top view of the vehicle and illustrates the interior cabin of the vehicle illustrated in FIG. 1.

FIG. 2 illustrates a top view of the vehicle 140 and illustrates the interior cabin of the vehicle 140. The interior cabin of the vehicle 140 can include a plurality of seats 200. Each of the seats 200 can include one or more sensors 130. The sensors 130 can be weight or occupancy sensors. The interior cabin of the vehicle 140 can include a plurality of speakers 132. The vehicle 140 can also include a head unit 202, which can execute one or more of the components described in relation to the data processing system 102 or the vehicle 140. For example, with user consent, the speakers 132 can generate sub-audible tones 204. The sub-audible tones 204 can be tones rendered by the speakers 132 that are not within the normal frequency range detectable by users. The system 100 can use audible tones in place of the sub-audible tone 204. The head unit 202 can include all of components of the data processing system within the vehicle 140. For example, the head unit 202 can include the data processing system 102 configured as a digital audio assistant application.

The validation engine 116 can determine the relative position of a client device 128 within the vehicle 140. The position of the client device 128 can be incorporated into one or more attributes of the request state or vehicular state. The position or location of the client devices 128 be a relative position and can include different levels of resolution. For example, the relative location can be regions related to one of the seats 200 (e.g., the client device 128(1) is associated with the passenger seat 200), regions related to different zones (e.g., the client devices 128(1) and 128(2) are in the front zone and no client devices 128 are in the back zone).

The relative location of the client devices 128 within the vehicle 140 can be determined using sub-audible tones 204. The relative location of the client devices 128 within the vehicle 140 can also be determined based on sensor data from the sensors 130. The relative location of the client devices 128 within the vehicle 140 can be determined based on a combination of the sub-audible tones and sensor data from the sensors 130.

The validation engine 116 can determine the relative location of a client device 128 by determining a time difference between the transmission of a sub-audible tone 204 and the receipt of the sub-audible tone 204 by a client device 128. For example, the head unit 202 can cause one of the speakers 132 to generate a sub-audible tone 204. The speaker 132 can generate the sub-audible tone 204 at a first time. A client device 128 that is relatively closer to the speaker 132 that generated the sub-audible tone 204 will receive the sub-audible tone 204 before a client device 128 that is relatively farther from the speaker 132 that generated the sub-audible tone 204. For example, as illustrated in FIG. 2, the client device 128(1) will receive the sub-audible tone 204 before the client device 128(2).

Once a client device 128 receives or otherwise detects the sub-audible tone 204, the client device 128 can generate a receipt notification that the client device 128 transmits to the head unit 202 or the data processing system 102. The receipt notification can indicate a second time at which the speaker 132 received the sub-audible tone 204. The receipt notification can be transmitted to the data processing system 102 via a cellular network, WiFi network local to the vehicle 140, or via Bluetooth. The validation engine 116 can determine the length of time between the generation of the sub-audible tone 204 and when the client device 128 received the sub-audible tone 204 (e.g., the time difference between the first and second times in the above example). Different speakers 132 can generate different sub-audible tones 204 at different times to enable the data processing system 102 to triangulate the location of the client device 128 within the vehicle 140.

The validation engine 116 can determine the location of the client devices 128 based on data from the sensors 130. The sensors 130 can be weight sensors that can determine if a seat 200 is occupied. For example, the validation engine 116 can determine the seat 200 is occupied when the sensor 130 registers a weight above a predetermined threshold. In some implementations, the validation engine 116 can determine, using the sub-audible tone 204 that a client device 128 is near one of the seats 200. The validation engine 116 can confirm that a user is associated with the client device 128 based on receiving sensor data that the sensor 130 of the determined seat 200 is detecting weight. The sensor data can be used to prevent a user form accessing functions that are only available to certain zones or users. For example, text messaging may be disabled on the client device 128 associated with the driver but enabled for the client devices 128 associated with passengers in the other seats 200 of the vehicle 140. If a driver were to lean over and move his client device 128 into the area of the passenger seat 200, based on the sub-audible tones 204, the validation engine 116 may determine that the client device 128 is associated with the passenger seat 200 and should be allowed to generate requests to use the text messaging program. The validation engine 116 can receive weight data of 0 lbs. from the sensor 130 in the passenger seat 200 and determine that a user is not actually in the passenger seat 200 and may prevent the driver's client device 128 from accessing the text message functionality. In some implementations, the validation engine 116 may update the relative locations of the client devices 128 in the vehicle 140 only after detecting the opening and closing of a door of the vehicle 140.

Figure 3:
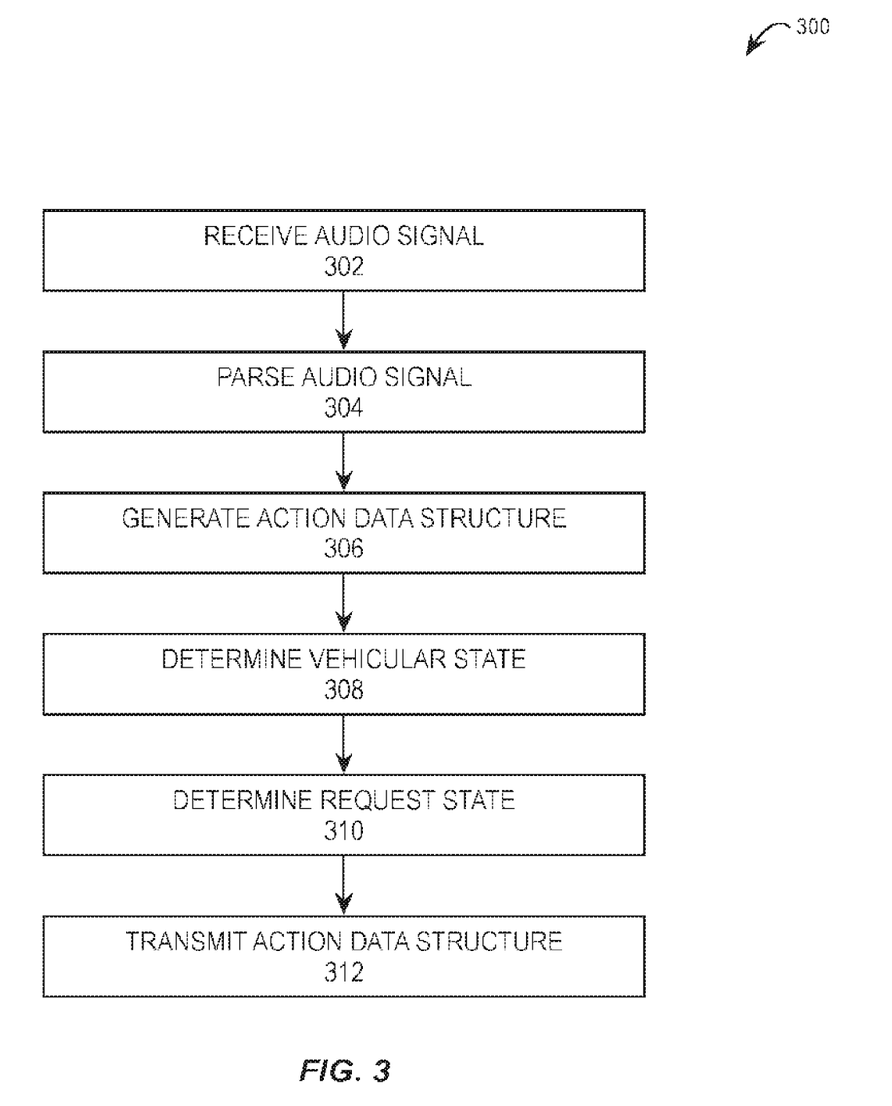
FIG. 3 illustrates an example method to validate vehicular functions using the example system illustrated in FIG. 1.

FIG. 3 illustrates an example method 300 to validate vehicular functions. The method 300 can include receiving an audio signal (BLOCK 302). The method 300 can include parsing the audio signal (BLOCK 304). The method 300 can include generating an action data structure (BLOCK 306). The method 300 can include determining a vehicular state (BLOCK 308). The method 300 can include determining a request state (BLOCK 310). The method 300 can include transmitting the action data structure (BLOCK 312).

The method 300 can include receiving an input audio signal (BLOCK 302). A data processing system can receive the input audio signal. For example, a NLP component, executed by the data processing system, can receive the input audio signal. The data processing system (and the NLP component) can be a component of or otherwise executed by a client device, a vehicle, or be a standalone device. The sensor, such as a microphone, at the client device or the vehicle can detect the input audio signal and then the respective client device or vehicle can transmit the input audio signal to the data processing system. For example, an application executed on the client device can detect a user speaking "Ok, open the sunroof." The detected utterance can be encoded into an input audio signal and transmitted to the NLP component of the data processing system or vehicle.

The method 300 can include parsing the input audio signal (BLOCK 304). The NLP component can parse the input audio signal to identify a request in the input audio signal. The NLP component can identify a vehicle associated with the request. The NLP component can identify a fulfillment interface associated with the request and the vehicle. The fulfillment interface can be the interface of one of the client device or the vehicle that will execute the action data structure to fulfill the request of the input audio signal.

In the above example, the request can be to open the sunroof. In this example, the fulfillment interface can be the interface of the vehicle that includes the sunroof. In some implementations, the vehicle can be explicitly stated in the input audio signal. For example, a user may assign nicknames to his vehicle (e.g., the user may name his red Toyota Camry the "red car"). When explicitly stated, the input audio signal could be "OK, open the sunroof of my red car." In some implementations, the data processing system can determine which vehicles associated with the user's account can fulfill the action. For example, the user's red car may include a sun roof and the user's blue car may not. After receiving the input audio signal "Ok, open the sunroof." The data processing system may automatically select the user's red car. In some implementations, the data processing system may ask the user for confirmation of the vehicle.

The method 300 can include generating an action data structure (BLOCK 306). The direct action API can generate the data structure that can be transmitted and processed by the client device or the vehicle to fulfil the request of the input audio signal. For example, continuing the above example, the direct action API can generate a first action data structure for opening the sunroof of the user's car. The direction action API can generate the action data structure using a template retrieved from the data processing system's data repository. The action data structure can include fields used to fulfill the request. For example, for the request to open the sunroof, the action data structure can include a field (or attribute) for the vehicle ID to which the action data structure should be transmitted if the action data structure is approved.

The method 300 can include determining a vehicular state (BLOCK 308). The vehicular state can include a plurality of attributes. The attributes can identify the current status of the vehicle. The vehicular state can include a plurality of sub-states, such as a movement state, an external environment state, an internal environment state, and a device state. The movement sub-state can include attributes such as current and average speed, current and average acceleration, driving mode status, and gear status. The external environment sub-state can include attributes such as external weather condition (e.g., raining, sunny, or snowing), external temperature, external weather condition forecast, and external temperature forecast. The internal environment sub-state can include attributes such as an internal temperature and an internal zone temperature. The device sub-state can include attributes such as HVAC status (e.g., air conditioning on, air conditioning off, heating on, etc.), window status, lock status, truck status, door ajar status, sunroof status, heated seat status, heated steering wheel status, and light status. The validation engine can determine the vehicular state using sensor data generate by the vehicle, the client device, or retrieved from a data provider. In some implementations, a validation engine executed at one location can determine the vehicular state and transmit the vehicular state to a second validation engine. For example, the validation engine executed at the vehicle can determine all or part of the vehicular state and then transmit the vehicular state to the validation engine executed at a remote data processing system.

The method 300 can include determining a request state (BLOCK 310). The request state can include a plurality of attributes. The attributes of the request state can indicate one or more conditions that should be fulfilled or satisfied before the action associated with the action data structure is completed. The attributes (and the request state) can be a component of or derived from the action data structure. For example, the action data structure for the request to open the sunroof can include a field that indicates under which external environmental conditions the sunroof should be opened. The validation engine can incorporate the external environmental conditions into the attributes of the request state. The request state can include a user attribute. The user attributes can include a location of a client device associated with the user or an authorization state. The location can be a location within the vehicle or a geographical location (e.g., the client device is located at the user's office).

The validation engine can determine the user's location with the vehicle using sub-audible tones. For example, the validation engine can cause one or more speakers within the vehicle to generate a sub-audible tone. The validation engine can determine the relative location of the client device in the vehicle be determining the delay between when the sub-audible tone was played at the speaker and when the client device detected the sub-audible tone. The user's (and client device's) relative location in the vehicle can be determined based on a weight or occupancy sensor reading placed in seats of the vehicle.

The method 300 can transmit the action data structure (BLOCK 312). The action data structure can be transmitted to a fulfillment interface that is configured to execute the function associated with the action data structure. In some implementations, the action data structure is only transmitted to the fulfillment interface if one or more attributes of the request state match one or more attributes of the vehicular state. For example, the validation engine can compare the attributes of the request state, which can indicate requirements for performing the function, to the attributes of the vehicular state. For example, the request to open the sunroof can have an external environment attribute requirement {external environment: [sunny, overcast, cloudy]}. The vehicular state can include, among other attributes, {external environment:rain}. In this example, the validation engine can determine that the request state attribute is not an element of the vehicular state attribute and the sunroof should not be opened because it is raining at the location of the vehicle. The validation engine can modify the action data structure when the validation engine determines there is not a match between the request state attributes and the vehicular state attributes. For example, the validation engine may modify the action data structure to turn on the HVAC of the vehicle in response to determining the sunroof should not be opened because it is raining. The validation engine may generate a prompt asking the user if the user would like the action data structure to be modified. For example, the data processing system may generate a prompt "I did not open the sunroof because it is raining. Would you like me to turn on the AC instead?"

The validation engine can determine there is not a match between the request state attributes and the vehicular state attributes. The data processing system can generate a notification that informs the user the request was not completed. The notification can include a reason that the request was not completed. In some implementations, if the validation engine does not find a match, the validation engine discards the action data structure and does not transmit the action data structure to the fulfillment interface.

When, for example, the validation engine determines there is a match between the request state attributes and the vehicular state attributes, the validation engine can transmit the action data structure to the fulfillment interface to execute the function associated with the action data structure. For example, for opening the sunroof, the action data structure can be sent to the vehicle's head unit which can execute an application to control a motor that controls the position of the sunroof. In some implementations, the data processing system can transmit a confirmation that function was completed. For example, a text-based or audio-based output signal can be transmitted to the client device to indicate that the sunroof was opened.

Figure 4:
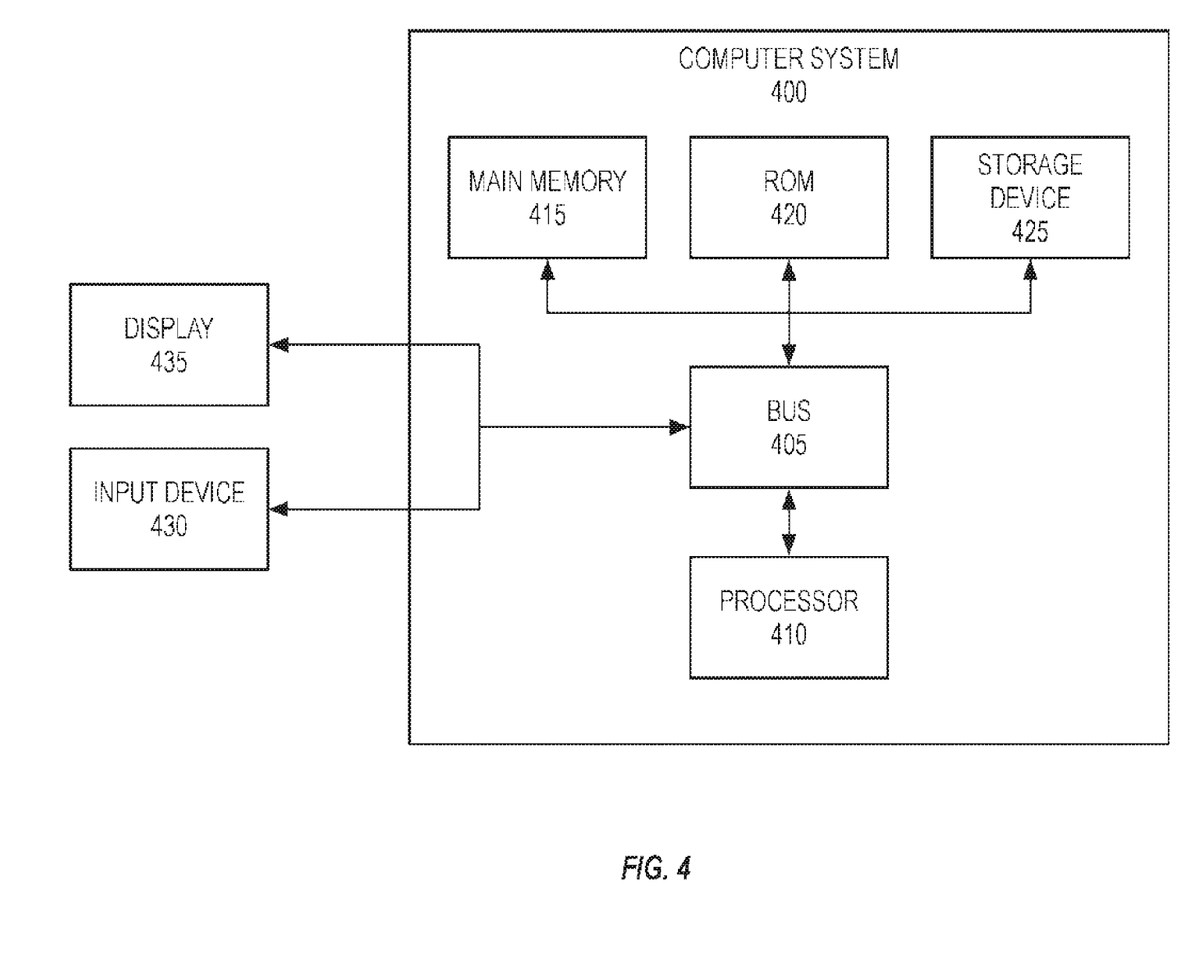
FIG. 4 is a block diagram of an example computer system.

FIG. 4 is a block diagram of an example computer system 400. The computer system or computing device 400 can include or be used to implement the system 100 or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 118. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 118.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 128 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 142). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 128 or the vehicle 140).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 and the validation engine 116 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method implemented by one or more processors comprising:
   identifying, based on processing received user input, a request to perform a vehicular function;
   generating, based on the request to perform the vehicular function, an action data structure that includes an action associated with the request to perform the vehicular function;
   determining a vehicular state of a vehicle associated with the request to perform the vehicular function based on first sensor data associated with the vehicle, wherein the vehicular state includes a plurality of first attributes;
   determining a request state associated with the request to perform the vehicular function based on second sensor data associated with the vehicle, wherein the request state includes a plurality of second attributes;
   comparing the plurality of second attributes of the request state to the plurality of first attributes of the vehicular state; and
   in response to determining one or more of the plurality of second attributes of the request state do not match one or more of the plurality of first attributes of the vehicular state:

modifying the action data structure to generate an alternative action data structure that includes an alternative action identified based on the request to perform the vehicular function; and causing the alternative action included in the alternative action data structure to be provided for presentation to a user that provided the user input via a client device of the user or a head unit of the vehicle.

2. The method of claim 1, wherein the plurality of first attributes of the vehicular state include at least an external environment attribute, and wherein the plurality of second attributes of the request state include at least an external environment requirement.

3. The method of claim 2, wherein determining one or more of the plurality of second attributes of the request state do not match one or more of the plurality of first attributes of the vehicular state comprises determining that the external environment attribute of the plurality of first attributes of the vehicular state does not meet the external environment requirement of the plurality of second attributes of the request state.

4. The method of claim 3, wherein the action associated with the request to perform the vehicular function includes an open window action, and wherein the alternative action identified based on the request to perform the vehicular function is a turn on air conditioning action.

5. The method of claim 1, wherein causing the alternative action included in the alternative action data structure to be provided for presentation to the user comprises:

generating a prompt to solicit whether the user would like to perform the alternative action included in the alternative action data structure in lieu of the action included in the action data structure.

6. The method of claim 5, further comprising:

subsequent to causing the alternative action included in the alternative action data structure to be provided for presentation to the user:

identifying, based on processing further received user input, a user confirmation to perform the alternative action included in the alternative action data structure; and in response to identifying the user confirmation to perform the alternative action:

causing the alternative action included in the alternative action data structure to performed by the vehicle.

7. The method of claim 5, further comprising:

subsequent to causing the alternative action included in the alternative action data structure to be provided for presentation to the user:

identifying, based on processing received further user input, a further request to override the modified action data structure; and in response to identifying the further request to override the alternative action:

causing the action included in the action data structure to performed by the vehicle.

8. A method implemented by one or more processors comprising:

identifying, based on processing received user input, a request to perform a vehicular function;

generating, based on the request to perform the vehicular function, an action data structure that includes an action associated with the request to perform the vehicular function;

determining a vehicular state of a vehicle associated with the request to perform the vehicular function based on first sensor data associated with the vehicle, wherein the vehicular state includes a plurality of first attributes;

determining a request state associated with the request to perform the vehicular function based on second sensor data associated with the vehicle, wherein the request state includes a plurality of second attributes;

comparing the plurality of second attributes of the request state to the plurality of first attributes of the vehicular state; and in response to determining one or more of the plurality of second attributes of the request state do not match one or more of the plurality of first attributes of the vehicular state:

discarding the action data structure;

generating a notification that indicates the action included in the action data structure was not performed; and causing the notification to be provided for presentation to a user that provided the user input via a client device of the user or a head unit of the vehicle.

9. The method of claim 8, wherein the action associated with the request to perform the vehicular function includes changing a device state of one or more devices of the vehicle.

10. The method of claim 9, wherein the plurality of first attributes of the vehicular state include at least the device state of one or more of the devices of the vehicle, and wherein the plurality of second attributes of the request state include at least an authorization level requirement.

11. The method of claim 10, wherein determining one or more of the plurality of second attributes of the request state do not match one or more of the plurality of first attributes of the vehicular state comprises determining that an authorization level of the user that provided the request does not match the authorization level requirement to change the device state of one or more of the devices of the vehicle.

12. The method of claim 9, wherein the plurality of first attributes of the vehicular state include at least the device state of one or more of the devices of the vehicle, and wherein the plurality of second attributes of the request state include at least a driving mode status requirement.

13. The method of claim 12, wherein determining one or more of the plurality of second attributes of the request state do not match one or more of the plurality of first attributes of the vehicular state comprises determining that a driving mode of the vehicle does not match the driving mode status requirement to change the device state of one or more of the devices of the vehicle.

14. A system comprising:

at least one processor; and at least one memory storing instructions that, when executed, cause the at least one processor to:

identify, based on processing received user input, a request to perform a vehicular function;

generate, based on the request to perform the vehicular function, an action data structure that includes an action associated with the request to perform the vehicular function;

determine a vehicular state of a vehicle associated with the request to perform the vehicular function based on first sensor data associated with the vehicle, wherein the vehicular state includes a plurality of first attributes;

determine a request state associated with the request to perform the vehicular function based on second sensor data associated with the vehicle, wherein the request state includes a plurality of second attributes;

compare the plurality of second attributes of the request state to the plurality of first attributes of the vehicular state; and in response to determining one or more of the plurality of second attributes of the request state do not match one or more of the plurality of first attributes of the vehicular state:

modify the action data structure to generate an alternative action data structure that includes an alternative action identified based on the request to perform the vehicular function; and cause the alternative action included in the alternative action data structure to be provided for presentation to a user that provided the user input via a client device of the user or a head unit of the vehicle.

15. The system of claim 14, wherein the plurality of first attributes of the vehicular state include at least an external environment attribute, and wherein the plurality of second attributes of the request state include at least an external environment requirement.

16. The system of claim 15, wherein the instructions to determine one or more of the plurality of second attributes of the request state do not match one or more of the plurality of first attributes of the vehicular state comprise instructions to determine that the external environment attribute of the plurality of first attributes of the vehicular state does not meet the external environment requirement of the plurality of second attributes of the request state.

17. The system of claim 16, wherein the action associated with the request to perform the vehicular function includes an open window action, and wherein the alternative action identified based on the request to perform the vehicular function is a turn on air conditioning action.

18. The system of claim 14, wherein the instructions to cause the alternative action included in the alternative action data structure to be provided for presentation to the user comprise instructions to:

generate a prompt to solicit whether the user would like to perform the alternative action included in the alternative action data structure in lieu of the action included in the action data structure.

19. The system of claim 18, wherein the instructions further cause the at least one processor to:

subsequent to causing the alternative action included in the alternative action data structure to be provided for presentation to the user:

identify, based on processing further received user input, a user confirmation to perform the alternative action included in the alternative action data structure; and in response to identifying the user confirmation to perform the alternative action:

cause the alternative action included in the alternative action data structure to performed by the vehicle.

20. The system of claim 18, wherein the instructions further cause the at least one processor to:

subsequent to causing the alternative action included in the alternative action data structure to be provided for presentation to the user:

identify, based on processing received further user input, a further request to override the modified action data structure; and in response to identifying the further request to override the alternative action:

cause the action included in the action data structure to performed by the vehicle.

\* \* \* \* \*